United States Patent
Haynes

[11] Patent Number: 6,011,352
[45] Date of Patent: Jan. 4, 2000

[54] FLAT FLUORESCENT LAMP

[75] Inventor: Bryan D. Haynes, Pacifica, Calif.

[73] Assignee: Add-Vision, Inc., Pacifica, Calif.

[21] Appl. No.: 08/978,075

[22] Filed: Nov. 25, 1997

Related U.S. Application Data

[60] Provisional application No. 60/031,965, Nov. 27, 1996.

[51] Int. Cl.⁷ ...................................................... H01J 1/62
[52] U.S. Cl. ............................ 313/505; 313/509; 313/512
[58] Field of Search .................................... 313/505, 509, 313/512; 315/169.3; 428/917

[56] References Cited

U.S. PATENT DOCUMENTS

| | | | |
|---|---|---|---|
| 2,883,582 | 4/1959 | Hanlet | 315/169 |
| 2,928,974 | 3/1960 | Mash | 313/108 |
| 2,932,746 | 4/1960 | Jay, Jr. | 250/213 |
| 2,951,970 | 9/1960 | Matarese | 315/169 |
| 3,571,647 | 3/1971 | Robinson | 313/108 |
| 3,571,654 | 3/1971 | Suzuki | 315/5 |
| 4,020,389 | 4/1977 | Dickson et al. | 315/246 |
| 4,066,925 | 1/1978 | Dickson | 313/503 |
| 4,416,933 | 11/1983 | Antson et al. | 428/216 |
| 4,482,580 | 11/1984 | Emmett et al. | 427/66 |
| 4,613,793 | 9/1986 | Panicker et al. | 315/169.3 |
| 4,661,373 | 4/1987 | Kato et al. | 427/66 |
| 4,670,690 | 6/1987 | Ketchpel | 313/505 |
| 4,689,522 | 8/1987 | Robertson | 313/506 |
| 4,814,668 | 3/1989 | Tohda et al. | 313/506 |
| 4,902,567 | 2/1990 | Eilertsen et al. | 428/328 |
| 5,162,696 | 11/1992 | Goodrich | 313/511 |
| 5,184,969 | 2/1993 | Sharpless et al. | 445/24 |
| 5,309,060 | 5/1994 | Sharpless et al. | 313/511 |
| 5,400,047 | 3/1995 | Beessely | 313/503 |
| 5,418,062 | 5/1995 | Budd | 428/403 |
| 5,463,279 | 10/1995 | Khormaei | 315/169.3 |
| 5,469,019 | 11/1995 | Mori | 313/509 |
| 5,565,733 | 10/1996 | Krafcik et al. | 313/510 |
| 5,869,930 | 2/1999 | Baumberg et al. | 313/506 |

OTHER PUBLICATIONS

McGraw–Hill Encyclopedia of Science & Technology, vol. 6, pp. 139, 1987.
McGraw–Hill Encyclopedia of Science & Technology, vol. 10, pp. 63, 1987.
Durel 3 Electroluminescent System, Product Selection Guide, Durel Corporation, 24 pp., 1995.

Primary Examiner—Nimeshkumar D. Patel
Assistant Examiner—Michael J. Smith
Attorney, Agent, or Firm—Pillsbury Madison & Sutro LLP

[57] ABSTRACT

Disclosed are thin, flexible electroluminescent lamps. The lamps comprise bubbles of a light emitting material distributed in a matrix. The bubbles can be formed as voids or transparent shells filled with a light emitting material. The bubbles may also include a conductive material and may be aligned in the matrix. Insulating material may be applied to the lamp's external electrodes to protect the lamp from the environment.

13 Claims, 3 Drawing Sheets

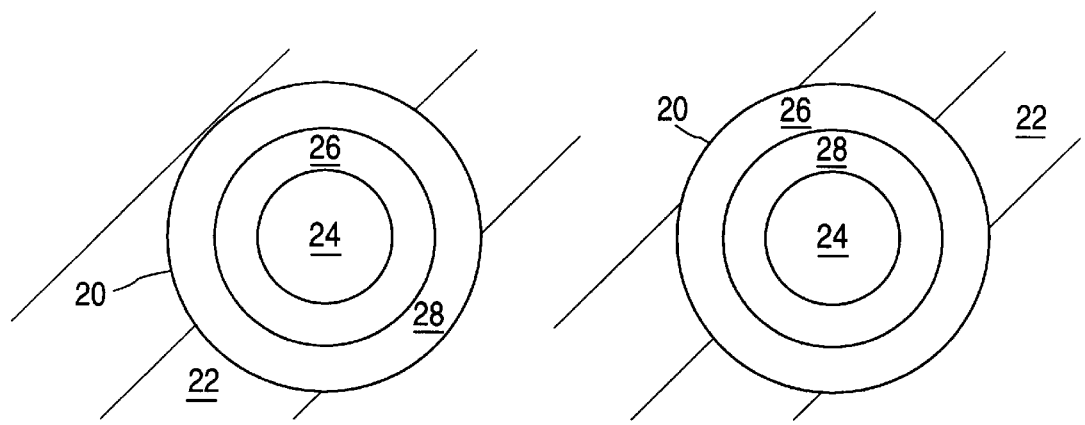
FIGURE 4A     FIGURE 4B
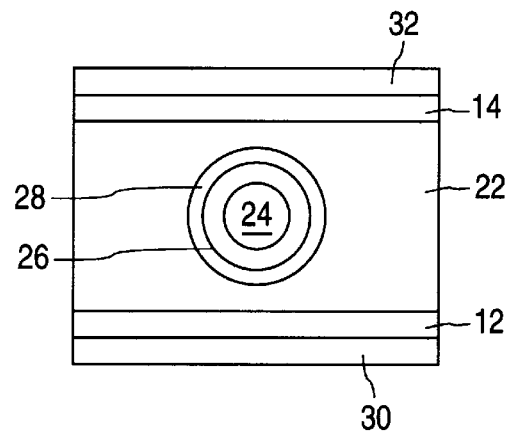
FIGURE 5
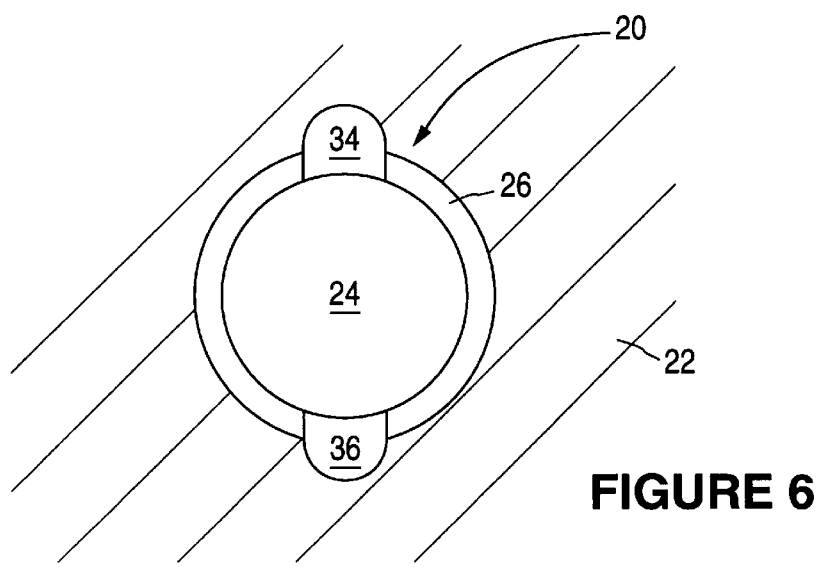
FIGURE 6

FLAT FLUORESCENT LAMP

CROSS-REFERENCE TO RELATED APPLICATIONS

This application claims benefit of U.S. Provisional Patent Application No. 60/031,965 for FLAT FLUORESCENT LAMP filed Nov. 27, 1996, which is incorporated herein by reference.

FIELD OF THE INVENTION

The present invention relates to lamps that may be fabricated as thin, flat sheets and may also be flexible. More specifically, the present invention relates to thin, flat electroluminescent lamps.

BACKGROUND OF THE INVENTION

Conventional fluorescent lamps generally consist of an elongated glass tube surrounding two electrodes, a phosphor that absorbs radiation at given wavelengths and reradiates energy at longer visible light wavelengths, and an inert gas to facilitate starting of the lamp. These lamps have been conventionally available since the 1940s.

Because of this construction, the utility of conventional fluorescent lamps is limited to environments where chances for breakage are relatively small. Also, thin glass lamps can be difficult and expensive to manufacture. In addition, because of their relatively high cost, conventional fluorescent lamps can be impractical for applications requiring numerous lamps.

SUMMARY OF THE INVENTION

The present invention addresses these and other limitations of conventional fluorescent lamps by providing lamps that generally include a matrix in which bubbles are distributed. The bubbles include a light emitting material. The matrix is sandwiched between two external electrodes connected to the power source. Insulating layers on the outside of the external electrodes can be used to protect the lamp from the environment. Lamps according to the present invention can be manufactured in sheets or strips.

Bubbles in the matrix may be formed in a number of ways. For example, the bubbles may be voids in a binder that are filled with a light emitting material. Alternatively, the bubbles may be a light emitting material surrounded by a light transmitting shell. According to another embodiment of the present invention, the bubbles can include a conductive layer adjacent to the shell. Also, the bubbles may include electrodes contacting the shell.

Lamps according to the present invention are useful where conventional fluorescent lamps are useful, e.g., room lighting. In addition, by virtue of their thinness, lightweight structure and flexibility, lamps according to the present invention are useful where fluorescent light is needed, such as in matrix displays, but where conventional lamps are ill-suited. The flexibility of lamps according to the present invention also enables their use in unconventionally shaped or limited space applications and their low profile can enhance or maintain streamlined silhouettes.

BRIEF DESCRIPTION OF THE DRAWINGS

The present invention will be better understood by reference to the figures of the drawings in which like reference numerals refer to like elements and in which:

FIGS. 3, 4A, 4B, 5 and 6 are sketches of several embodiments of bubbles used in lamps according to the present invention;

DETAILED DESCRIPTION OF THE INVENTION

Generally, lamps according to the present invention are flexible electroluminescent lamps that can be used as replacements of conventional fluorescent lamps and are well-suited for applications where conventional fluorescent lamps are impractical or inappropriate. Lamps according to the present invention can be manufactured to be as thin as conventional fluorescent lamps.

Figure 1:
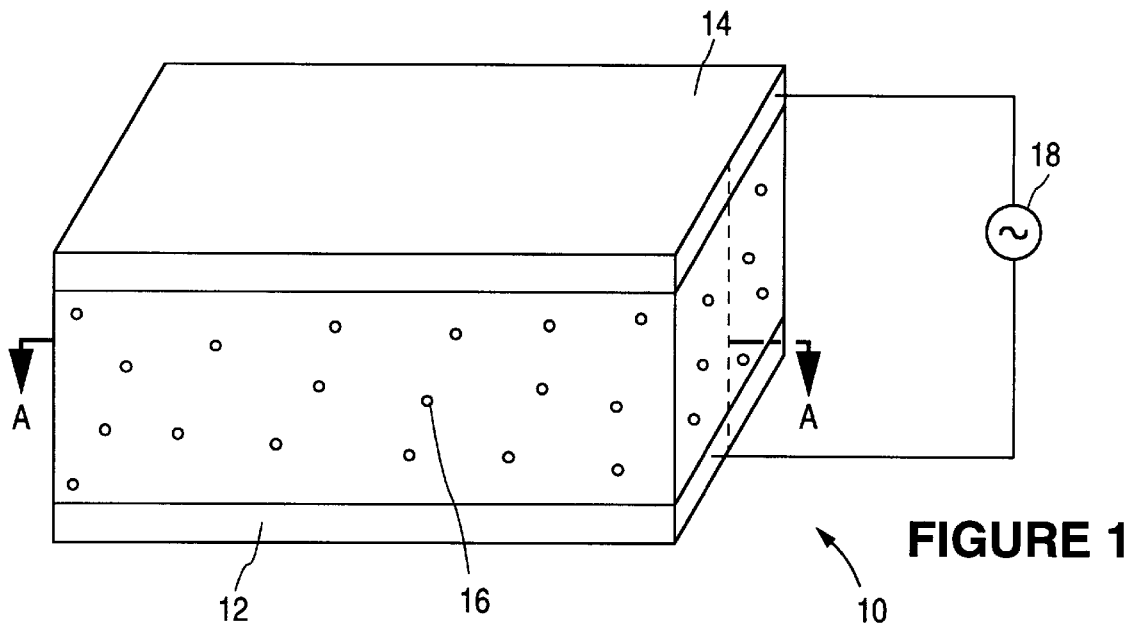
FIG. 1 is a sketch of one embodiment of a lamp according to the present invention.

FIG. 1 shows a lamp 10 according to the present invention that includes a rear external electrode 12, a front external electrode 14, a matrix 16 sandwiched between front and rear external electrodes 12, 14 and a power source 18 connected across the external electrodes.

Figure 2:
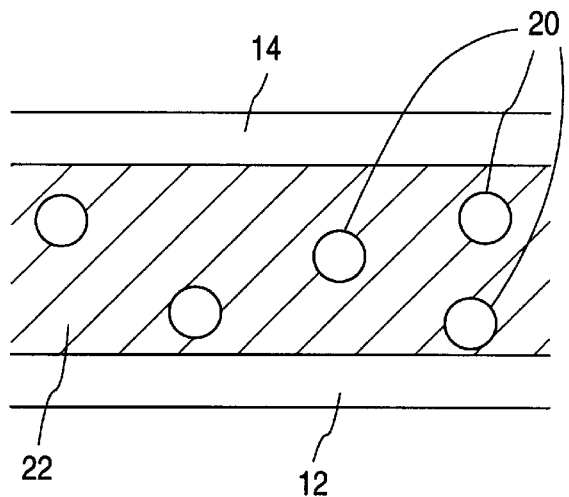
FIG. 2 is a cross-sectional view along line A—A of the lamp illustrated in FIG. 1.

FIG. 2 shows a detailed view of the cross-section A—A of FIG. 1, and shows that matrix 16 includes bubbles 20 which are suspended in a binder 22.

Figure 3:
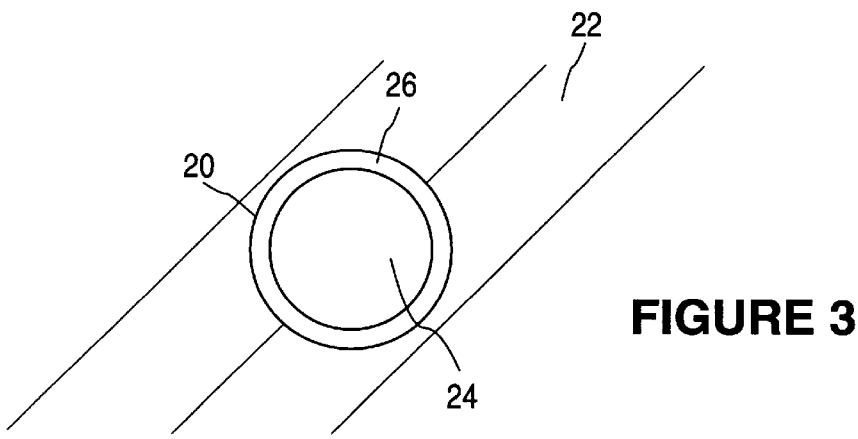

As shown in FIG. 3, bubbles 20 contain a material 24 that is capable of emitting light when subjected to an electric field. Material 24 may be a plasma, gas, vapor, liquid, solid or mixtures thereof. For example, the bubbles may contain a mixture of Hg vapor and Ar gas, as in conventional fluorescent strip lights. This example is not intended to be limiting; any material that is capable of emitting light when subjected to an electric field may be used.

Bubbles 20 may be formed as voids in binder 22; the bubbles would eventually be filled with a light emitting material 24. Alternatively, bubbles 20 may consist of a shell 26 encasing material 24, as can be prepared by conventional methods. FIG. 3 shows one embodiment of the present invention that includes a shell 26. Shell 26 must be at least partially transparent so that light emission of material 24 may be transmitted from bubbles 20. Examples of suitable shell materials include, but are not limited to, transparent and translucent polymers such as polyimides and glass.

FIG. 4A shows a further embodiment of the invention in which bubble 20 comprises a shell 26 that is coated with a conductive layer 28. Conductive layer 28 must be at least partially transparent. For example, indium tin oxide (ITO) may be used as a conductive layer. FIG. 4A shows conductive layer 28 disposed on the outside surface of shell 26; however, alternative embodiments of the invention may have the conductive layer disposed on the inner surface of the shell or the shell may be absent, in which case the conductive layer 28 encapsulates the material 24, as shown in FIG. 4B.

FIG. 5 illustrates an embodiment of the invention which includes front and rear external electrodes 12, 14 coated with insulating layers 30, 32 and a binder 22 supporting bubbles 20. Bubbles 20 include a shell 26 coated with a layer 28 of ITO. Shell 26 encases a material 24 which includes Ar gas and Hg vapor. In this embodiment, matrix 16 is formed from glass spheres containing Hg and Ar which are mixed into a binder such as cyano ethyl starch. This mixture is then printed (e.g., with silk screen printing or rotogravure techniques) onto rear external electrode 12 and further layers are printed on top of matrix layer 16.

Bubble 20 may also includes a layer or layers of material capable of converting light produced by material 24 into light with different spectral characteristics. For example, if material 24 is a mixture of Hg vapor and Ar gas, bubble 20 may include a layer of phosphor to convert the U.V. radiation emitted from the Hg vapor into visible light.

The size of the bubbles depends on the desired characteristics of the lamp; for example, the size of the bubbles may depend on the thickness of the lamp, the dielectric properties of the binding material, the geometries of the external electrodes, and the voltage and frequency at which the lamp is driven. The density of bubbles per volume of matrix 16 will depend on the required characteristics of the lamp. For example, the density of bubbles may depend on the required brightness of the lamp, the geometry of the external electrodes, the size of the bubbles, the nature of the light emitting material, and the frequency characteristics of the driving voltage. Thus, relatively greater light output can be achieved, for instance, using relatively large bubbles and relatively narrow external electrodes. The shape of the bubbles may be spherical or may be any, derived shape.

Binder 22 may be any material capable of supporting the bubbles between the front and rear external electrodes, has adequate dielectric properties and is at least partially transparent to the light emitted from the bubbles. Binder 22 may be either insulating or semi-conducting. Examples of suitable binders include, but are not limited to, cyano ethyl starch and epoxies.

Binder 22 may optionally contain other ingredients such as pigments, phosphors, etc. that are capable of converting the light emitted from the bubbles into light with different spectral characteristics.

Matrix 16 is sandwiched between rear external electrode 12 and front external electrode 14. If these external electrodes are opaque, light will only be emitted from the edge of the lamp. It is therefore preferred that at least one of the external electrodes is at least partially transparent. An opaque external electrode may be made of any suitable opaque conducting or semiconducting material including silver, aluminum, copper and carbon applied to a polyester film. A transparent or partially transparent external electrode may be made of a transparent or partially transparent material, for example, ITO, or may be a grid electrode. In this latter case, the grid may be made of any suitable conducting material and may have any suitable geometry such as those taught in provisional application no. 60/023, 923 (filing date, Aug. 14, 1996; title, Printable Electroluminescence Lamps) and provisional application no. 60/031, 715 filed Nov. 22, 1996 for "Printable Electroluminescent Lamps" by inventors Bryan D. Haynes and Michael C. Feldman, both of which are commonly owned by the assignee of the present invention and are incorporated herein by reference.

The distance between the external electrodes depends on the required characteristics (e.g., light output, bubble diameter, binder thickness) of the lamp.

FIG. 6 shows one embodiment of the invention in which bubble 20 further includes internal electrodes 34, 36 which are formed as part of shell 26. These electrodes act in much the same way as the electrodes in a conventional fluorescent lamp and provide a source of free electrons to assist in light emission.

Figure 7:
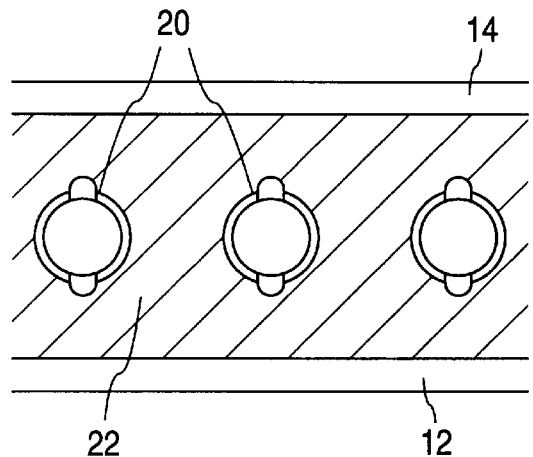
FIG. 7 is a sketch of bubbles aligned in a lamp according to the present invention.

FIG. 7 shows an embodiment of the invention in which bubbles 20 are aligned so that electrodes 34, 36 are pointing towards front and rear external electrodes 12, 14. One technique to achieve this kind of alignment involves first forming internal electrodes 34, 36 on the outer surface of the shell 26 and then printing the matrix. Before the binder has set, the matrix is subjected to electric and/or magnetic fields which aligns the bubbles. To facilitate this alignment, internal electrodes 34, 36 may be made of materials with different electromagnetic properties than other components of the lamp.

Figure 8:
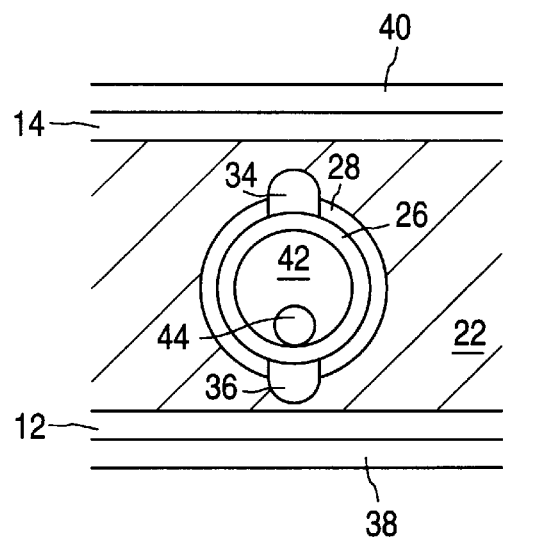
FIG. 8 is a sketch of another embodiment of a lamp according to the present invention.

FIG. 8 shows an embodiment of the invention which includes front and rear external electrodes 12, 14 coated with insulating layers 38, 40, and a binder 22 supporting bubbles 20. The bubbles include a shell 26 coated with a layer 28 of ITO, and internal electrodes 34, 36. Shell 26 encases a material 24 which includes Ar gas 42 and Hg vapor and liquid 44.

Figure 9:
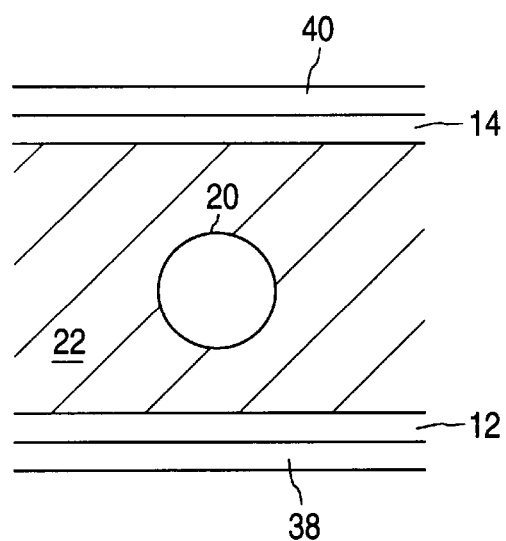
FIG. 9 illustrates another lamp according to the present invention in which the external electrodes are coated with an insulating material.

FIG. 9 shows a further embodiment of the invention in which the external electrodes are coated with insulating layers 38, 40 which protect external electrodes 12, 14 from the environment. Insulating layers 38, 40 may be made of any suitable non-conducting material, for example, a polyester film.

Lamps according to the present invention may optionally be supported on a substrate or may be sandwiched between two substrates. In the latter case, at least one of the supporting substrates must be at least partially transparent. The substrates may be made of any suitable material including glass, plastics, paper, polymer sheets, and woven materials.

Lamps according to the present invention may be made to be relatively flexible (compared to conventional fluorescent lamps) by utilizing flexible components. An exemplary flexible lamp according to the invention includes outer electrodes composed of ITO and silver printed on a polyester film and an epoxy binder.

In operation, front and rear electrodes 12, 14 are connected across an AC power source 18. The voltage and frequency characteristics of the power source will be chosen depending on the geometry of the lamp, the density and size of bubbles, the dielectric properties of the matrix and the nature of the fluorescent material. The voltage and frequency of the power source must be capable of causing material 24 to emit light. For example, if material 24 is a mixture of argon and Hg vapor, a 60 Hz power source is suitable. Power sources running at higher frequencies (e.g., 360 Hz–3000 Hz) may also be suitable. Optionally, the lamp may require a trigger power source to initiate fluorescence as is well known in conventional fluorescent strip lights.

Lamps according to the present invention may be fabricated as flat sheets or strips using conventional deposition or vacuum forming techniques or may be printed using the techniques described in the provisional applications incorporated by reference above.

I claim:

1. An electroluminescent lamp comprising:
    a matrix comprising bubbles distributed in a binder, said bubbles including a light emissive material surrounded by a light transmissive shell, said light emissive material comprising at least one of a gas and a vapor;
    a first electrode overlying said matrix; and
    a second electrode underlying said matrix.

2. A lamp according to claim 1, wherein said bubbles are voids in said binder filled with said light emissive material.

3. A lamp according to claim 1, wherein said bubbles further comprise a conductive layer disposed on one of an outside and an inside surface of said shell, said conductive layer being at least partially transparent.

4. An electroluminescent lamp comprising:
a matrix including bubbles distributed in said matrix, the bubbles including a light emissive material and a conductive layer disposed on at least one of an outside and an inside surface of said shell;
a first electrode overlying said matrix; and
a second electrode underlying said matrix;
wherein said bubbles further comprise third and fourth electrodes contacting said shell.

5. A lamp according to claim 1, further comprising a first insulating layer overlying said first electrode and a second insulating layer underlying said second electrode.

6. An electroluminescent lamp comprising:
a first electrode contacting an upper exterior surface of a matrix; and
a second electrode contacting a lower exterior surface of said matrix;
wherein said matrix includes at least one bubble suspended in a binder, said bubble including a light transmissive shell surrounding a light emissive material and third and fourth electrodes extending from said shell and contacting said matrix.

7. A lamp according to claim 6, further comprising a first insulating layer overlying said first electrode and a second insulating layer underlying said second electrode.

8. A lamp according to claim 6, wherein said bubble further includes a conductive layer disposed on at least one of an outside and an inside surface of said shell, said conductive layer being at least partially transparent.

9. A lamp according to claim 1, wherein said light emissive material comprises a mixture of Hg vapor and Ar gas.

10. A lamp according to claim 6, wherein said light emissive material comprises a mixture of Hg vapor and Ar gas.

11. A lamp according to claim 6, wherein said light transmissive material includes at least one of a gas and a vapor.

12. A lamp according to claim 4, wherein said third and fourth electrodes do not contact either of said first and second electrodes.

13. A lamp according to claim 6, wherein said third and fourth electrodes do not contact either of said first and second electrodes.

* * * * *